UNITED STATES PATENT OFFICE.

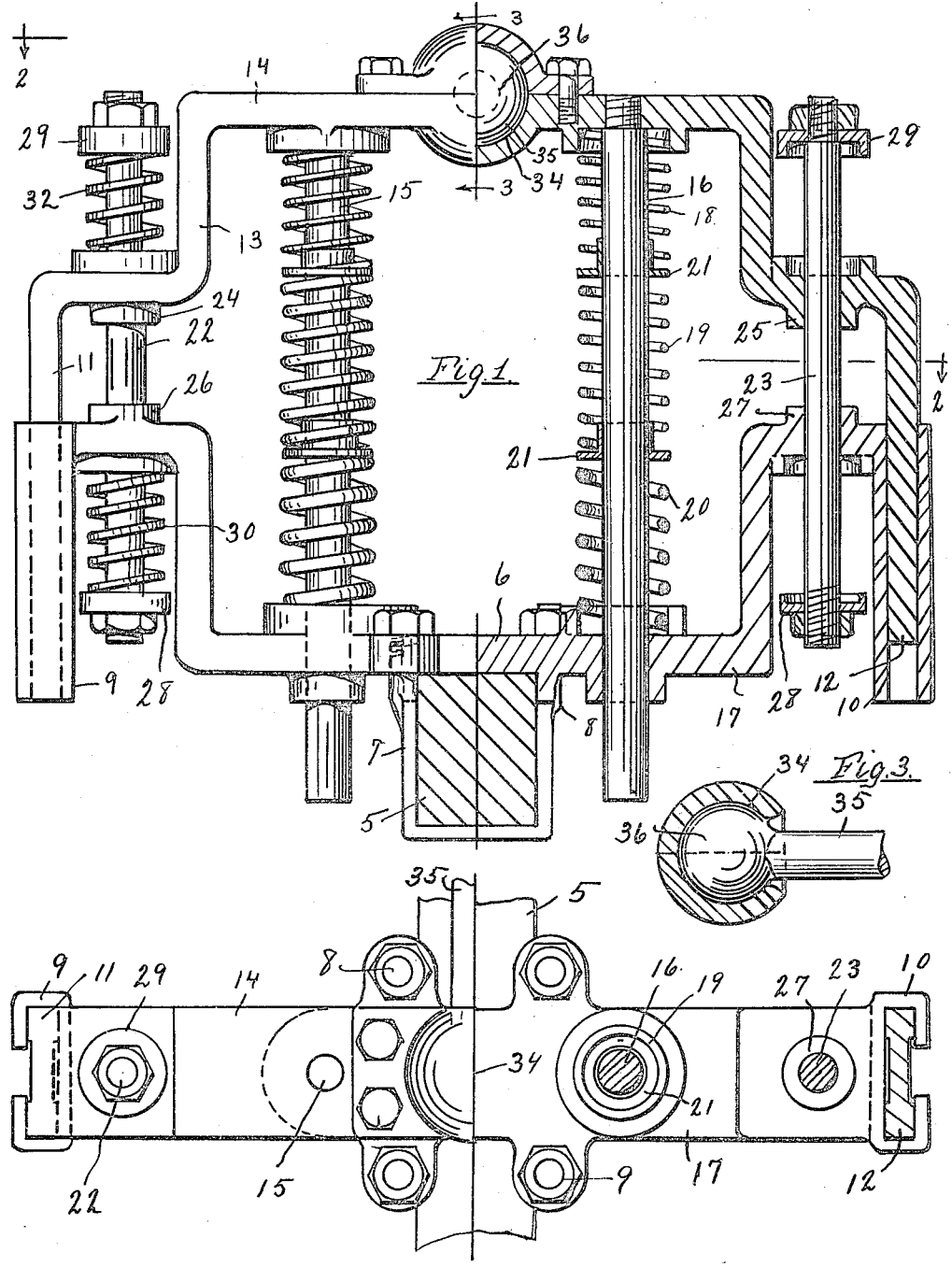

WILLIAM DORNAN, OF POMONA, CALIFORNIA.

VEHICLE-SPRING.

1,139,504.  Specification of Letters Patent.  Patented May 18, 1915.

Application filed April 27, 1914. Serial No. 834,735.

*To all whom it may concern:*

Be it known that I, WILLIAM DORNAN, a citizen of the United States, residing at the city of Pomona, in the county of Los Angeles and State of California, have invented new and useful Improvements in Vehicle-Springs, of which the following is a specification.

My invention relates to a spring for vehicles such as automobiles and the like and the object thereof is to provide springs for resisting the jar caused by passing over obstructions or into ruts in the roadway and which will prevent any objectionable recoil.

A further object is to provide a spring of varying strengths whereby the springs will adjust themselves to the varying weights of the load carried thereby.

I accomplish these objects by the mechanism described herein and illustrated in the accompanying drawings forming a part hereof in which;

Figure 1 is a side elevation, partly in section, of one of my springs. Fig. 2 is a top plan view of Fig. 1 taken on the line 2—2. Fig. 3 is a detail of the connection between the said spring and the body of the vehicle, taken on the line 3—3 of Fig. 1.

In the drawings 5 represents the axle of a vehicle upon the top of which is mounted a substantially U-shaped axle frame 6, in place of the ordinary spring, by means of clips 7 and 8. The upwardly extending legs of frame 6 are turned outwardly and have secured to the ends thereof downwardly extending guide ways 9 and 10 in which are slidably received the guide members 11 and 12 of the spring frame 13. Frame 13 is of substantially inverted U-shape and the legs thereof are bent outwardly a short distance and then downwardly and terminate in guide members 11 and 12. In the top cross bar 14 of frame 13 are secured the upper ends of spring bolts 15 and 16 which bolts extend downwardly and pass loosely through openings in the lower cross bar 17 of frame 6. Mounted on these bolts between the cross bars of the axle and spring frames are the load carrying springs 18, 19 and 20. These springs are of varying strength and weights, the bottom spring 20 being the heaviest and strongest and the top spring 18 being the lightest and weakest. Spring 19 will be of a medium weight and strength. Separators 21 are mounted upon bolts 15 and 16 to provide bearings for the opposed ends of the springs. This peculiar spring construction forms an important feature of my invention. Spring bolts 22 and 23 are slidably mounted in bearings 24 and 25 in the short outwardly bent portions of frame 13 and in bearings 26 and 27 in the adjacent portions of frame 6 and have mounted upon the ends thereof spring cups 28 and 29. Rebound springs 30 are mounted upon bolts 22 and 23 between cups 28 and frame 6. Similar rebound springs 32 are mounted upon bolts 22 and 23 between cups 29 and frame 13. In the center of the cross bar 14 of frame 13 is formed a globular socket 34 in which is mounted the globular end 36 of a supporting rod 35. Rod 35 supports the body of the vehicle. It will be understood that the shock and rebound springs are compressed slightly when positioned for use.

While I have shown two sets of shock and rebound springs it will be understood that I do not limit myself to such construction but that the number of sets of springs may be varied to suit the conditions as desired.

The particular feature of my invention lies in the construction and arrangement of the shock springs, as by this construction a light load will ride upon the light springs 18; a medium load will ride upon springs 18 and 19 and a heavy load will ride upon all three springs, thus providing a vehicle spring having the maximum amount of flexibility in passing over rough roads, which will effectively resist the rebound thereof.

Having described my invention what I claim is;

1. A vehicle spring comprising a U-shaped axle frame; said frame having vertically extending guideways at the ends of the legs thereof; an inverted U-shaped spring frame, said spring frame having vertically extending guide members at the ends of its legs adapted to be slidably received in the guideways of the axle frame; guide rods secured at their upper ends in the spring frame and extending downwardly therefrom and passing through holes in the axle frame; a plurality of load carrying springs coiled around each of said guide rods between the axle frame and the spring frame, the springs on each rod being mounted one above the other and having their adjacent ends contacting and being of different load carrying power, the weaker spring being at the top and the strongest spring being at the bottom and the intermediate springs being of intermediate strength; spring rods passing through said frames near the ends of the legs thereof; spring cups on the ends of said rods; rebound springs coiled around said rods between said cups and the frames; a globular socket in the center of the top of said spring frame; and a connection between said socket and the body of the vehicle.

2. A vehicle spring comprising a U-shaped axle frame having the ends thereof bent outwardly and then upwardly; an inverted U-shaped spring frame having the ends of the legs thereof bent outwardly and then downwardly; guideways on the upturned ends of the legs of the axle frame in which are slidably received the downturned ends of the legs of the spring frame; guide rods secured at one end in the cross bar of the spring frame and passing slidably through the cross bar of the axle frame; a plurality of load carrying springs coiled one above the other around said guide rods between the cross bars of said frames, each of said springs being of different load carrying power and having their adjacent ends contacting; rebound spring rods extending slidably through the outturned portions of the ends of said frames; spring retaining cups adjustably secured upon the ends of said spring rods; rebound springs at each end of said spring rods between said retaining cups and the frames; and a connection between the top of the spring frame and the body of the vehicle.

3. A vehicle spring comprising a U-shaped axle frame mounted upon the axle of the vehicle the ends of the legs thereof terminating in guideways; an inverted U-shaped spring frame adapted to be connected to the body of the vehicle having the ends of the legs thereof slidably mounted in the guideways in the ends of the legs of the axle frame, said spring frame being mounted above the axle frame; a plurality of load carrying springs mounted one above the other between the cross bars of said frames and having their adjacent ends contacting, said springs being of varying load carrying resistance from the lowest spring upwardly; rebound springs connecting the ends of said frames; and a connection from the top of said spring frame to the body of the vehicle.

In witness that I claim the foregoing I have hereunto subscribed my name this 18th day of April, 1914.

WILLIAM DORNAN.

Witnesses:
 MARSHALL TILDEN,
 E. P. PARKER.

Copies of this patent may be obtained for five cents each, by addressing the "Commissioner of Patents, Washington, D. C."